United States Patent
Cyborski et al.

(10) Patent No.: US 9,714,587 B2
(45) Date of Patent: Jul. 25, 2017

(54) BRIDGE ASSEMBLY HAVING MOTION-LIMITED VALVE

(71) Applicant: Caterpillar Inc., Peoria, IL (US)

(72) Inventors: David Andrew Cyborski, Peoria, IL (US); John Stephen Pipis, Jr., Washington, IL (US); Edwin H. Langewisch, Dunlap, IL (US); Sanjay Kumar, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 276 days.

(21) Appl. No.: 14/595,770

(22) Filed: Jan. 13, 2015

(65) Prior Publication Data
US 2016/0201524 A1    Jul. 14, 2016

(51) Int. Cl.
| | | |
|---|---|---|
| F01L 1/14 | (2006.01) |
| F01L 1/26 | (2006.01) |
| F16K 1/14 | (2006.01) |
| F16K 1/32 | (2006.01) |
| F01L 1/24 | (2006.01) |
| F01L 1/047 | (2006.01) |

(52) U.S. Cl.
CPC .............. *F01L 1/26* (2013.01); *F01L 1/2411* (2013.01); *F16K 1/14* (2013.01); *F16K 1/32* (2013.01); *F01L 1/146* (2013.01); *F01L 2001/054* (2013.01); *F01L 2105/00* (2013.01); *F01L 2250/02* (2013.01); *F01L 2250/04* (2013.01)

(58) Field of Classification Search
CPC ..... F01L 1/26; F01L 1/2411; F01L 2001/054; F16K 1/32
See application file for complete search history.

(56) References Cited

U.S. PATENT DOCUMENTS

| | | |
|---|---|---|
| 2,634,714 A | 4/1953 | Randol |
| 4,805,567 A | 2/1989 | Heimburg |
| 5,758,613 A | 6/1998 | Edelmayer et al. |
| 7,089,900 B2 | 8/2006 | Masello et al. |

(Continued)

FOREIGN PATENT DOCUMENTS

WO    WO 2008/068117    6/2008

OTHER PUBLICATIONS

David Andrew Cyborski et al., U.S. Patent Application entitled "Compact Valve Bridge Assembly Having Cartridge Insert" filed on Jan. 13, 2015.

*Primary Examiner* — Zelalem Eshete
(74) *Attorney, Agent, or Firm* — Finnegan, Henderson, Farabow, Garrett & Dunner, LLP

(57) ABSTRACT

A bridge assembly is disclosed for use with an internal combustion engine. The bridge assembly may have a valve bridge, a cylindrical housing disposed within the valve bridge, and a plunger disposed in the cylindrical housing and protruding from the valve bridge. The bridge assembly may also have a valve housing, a post located inside the valve housing, a plurality of obliquely angled ports passing through a straight annular wall portion of the valve housing, and a plurality of radially oriented ports passing through a tapered annular wall portion of the housing. The bridge assembly may further have a valve seat disposed at least partially inside the plunger, a ball disposed within the valve housing and movable between a distal end of the post and the valve seat, a first spring disposed over the post, and a second spring disposed within the cylindrical housing.

1 Claim, 3 Drawing Sheets

(56) References Cited

U.S. PATENT DOCUMENTS

| | | |
|---|---|---|
| 7,146,954 B2 | 12/2006 | Sailer et al. |
| 7,328,676 B2 | 2/2008 | Schnell et al. |
| 7,421,994 B2 | 9/2008 | Harris et al. |
| 7,921,818 B2 | 4/2011 | Rauch et al. |
| 8,210,144 B2 | 7/2012 | Langewisch |
| 8,578,901 B2 | 11/2013 | Ruggiero et al. |
| 8,646,425 B2 | 2/2014 | Methley et al. |
| 2012/0132162 A1 | 5/2012 | Yoon et al. |
| 2012/0234067 A1 | 9/2012 | Janowiak |
| 2013/0152885 A1 | 6/2013 | Remala et al. |
| 2014/0020644 A1 | 1/2014 | Roberts et al. |
| 2014/0326212 A1 | 11/2014 | Baltrucki et al. |
| 2015/0021508 A1* | 1/2015 | Nair .......................... F01L 1/26 251/366 |

* cited by examiner

BRIDGE ASSEMBLY HAVING MOTION-LIMITED VALVE

TECHNICAL FIELD

The present disclosure is directed to a bridge and, more particularly, to a bridge having a motion-limited valve assembly.

BACKGROUND

Each cylinder of an internal combustion engine is equipped with one or more gas exchange valves (e.g., intake and exhaust valves) that are cyclically opened during normal operation. In a conventional engine, the valves are opened by way of a camshaft/rocker arm configuration. The camshaft includes one or more lobes arranged at particular angles corresponding to desired lift timings and amounts of the associated valves. The cam lobes are connected to stem ends of the associated valves by way of the rocker arm and associated linkage components. As the camshaft rotates, the cam lobes come into contact with a first pivoting end of the rocker arm, thereby forcing a second pivoting end of the rocker arm against the stem ends of the valves. This pivoting motion causes the valves to lift or open against a spring bias. As the cam lobes rotate away from the rocker arm, the valves are released and allowed to return to their closed positions.

When a cylinder is equipped with more than one of the same type of gas exchange valve (e.g., more than one intake valve and/or more than one exhaust valve), all valves of the same type are typically opened at about the same time. And in order to reduce a number of camshafts, cam lobes, and/or rocker arms required to open the multiple valves, a valve bridge is often used to interconnect the same type of valves with a common rocker arm.

A valve bridge is generally T-shaped, having arms that extend between the stem ends of two like valves. The second end of the rocker arm engages a center portion of the valve bridge, between the arms. With this configuration, a single pivoting motion imparted to the center of the valve bridge by the rocker arm results in lifting of the paired valves by about the same amount and at about the same timing. A lash adjuster can be associated with the valve bridge and used to remove clearance that exists between the valves and corresponding seats (and/or between other valve train components) when the valve is released by the rocker arm. The lash adjuster helps to ensure sealing of the cylinder during the ensuing combustion process.

An exemplary valve bridge is disclosed in U.S. Pat. No. 8,210,144 that issued to Langewisch on Jul. 3, 2012 ("the '144 patent"). Specifically, the '144 patent discloses a T-shaped valve bridge having a center portion and lateral extensions located at opposing sides of the center portion. A bridge cavity is formed within the center portion to receive a lash adjuster assembly. The lash adjuster assembly includes a plunger disposed within the bridge cavity to form a hydraulic chamber. The plunger is configured to engage a button member located at an end of a rocker arm and is hydraulically connected to the rocker arm via the button member. A check valve is disposed within the plunger, and includes a ball element separating a reservoir chamber from the hydraulic chamber. The ball element is spring-biased upward against a seat to cut off fluid communication between the two chambers. As pressure within the hydraulic chamber drops below a pressure of the reservoir chamber, the ball element moves away from the seat to allow fluid from the reservoir chamber into the hydraulic chamber.

Although the valve bridge of the '144 patent may be suitable for many applications, it may still be less than optimal. For example, it may be possible for the element of the check valve to move off-center and become stuck under some conditions. When the element becomes stuck, the lash adjust may not function as intended.

The bridge assembly of the present disclosure is directed towards overcoming one or more of the problems set forth above and/or other problems of the prior art.

SUMMARY

One aspect of the present disclosure is directed to a valve body. The valve body may include a housing having an open end configured to receive a valve element, and a closed end. The valve body may also include a post located inside the housing and extending from the closed end toward the open end and configured to limit movement of the valve element, and at least one port passing through an annular wall of the housing at a location between the open and closed ends.

Another aspect of the present disclosure is directed to a valve assembly. The valve assembly may include a housing having an open end and a closed end, a post located inside the housing and extending from the closed end toward the open end, and at least one port passing through an annular wall of the housing at a location between the open and closed ends. The valve assembly may also include a valve seat disposed at the open end of the housing, and a valve element disposed within the housing and movable between a distal end of the post and the valve seat. The valve assembly may further include a spring disposed over the post and configured to bias the valve element against the valve seat.

Yet another aspect of the present disclosure is directed to a bridge assembly. The bridge assembly may include a valve bridge with a center portion, opposing lateral extensions, and a bore formed in the center portion, and a cylindrical housing disposed within the bore of the valve bridge. The bridge assembly may also include a plunger with a first end having a larger opening and a second end having a smaller opening. The first end of the plunger may be disposed within the cylindrical housing and the second end may protrude from the center portion. The bridge assembly may also include a valve housing with an open end and a closed end, a post located inside the valve housing and extending from the closed end toward the open end, a plurality of obliquely angled ports passing through a straight annular wall portion of the valve housing at a location between the open and closed ends, and a plurality of radially oriented ports passing through a tapered annular wall portion of the valve housing at the closed end. The bridge assembly may further include a valve seat disposed at the open end of the valve housing and at least partially inside the first end of the plunger, a bail disposed within the valve housing and movable between a distal end of the post and the valve seat, a first spring disposed over the post inside the valve housing and configured to bias the ball against the valve seat, and a second spring disposed within the cylindrical housing and configured to bias the valve housing, valve seat, and plunger out of the cylindrical housing.

DETAILED DESCRIPTION

Figure 1:
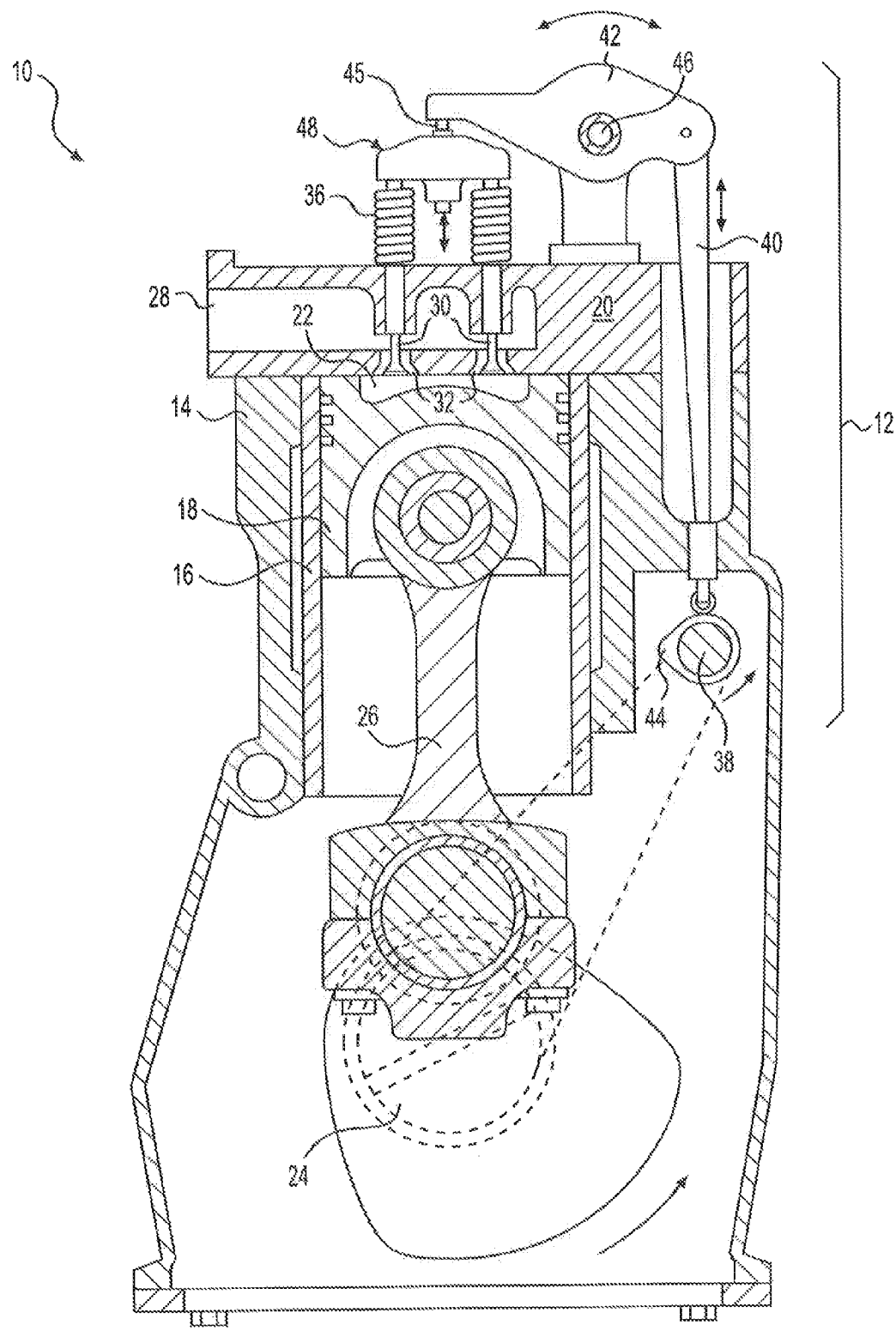
FIG. 1 is a diagrammatic illustration of an exemplary disclosed engine valve actuation system.

FIG. 1 illustrates an engine equipped with an exemplary disclosed valve actuation system 12. For the purposes of this disclosure, engine 10 is depicted and described as a four-stroke diesel engine. One skilled in the art will recognize, however, that engine 10 may embody any type of combustion engine such as, for example, a two- or four-stroke, gasoline or gaseous fuel-powered engine. As will be described in more detail below, valve actuation system 12 may help regulate fluid flows through engine 10.

Engine 10 may include an engine block 14 that at least partially defines one or more cylinders 16. A piston 18 and a cylinder head 20 may be associated with each cylinder 16 to form a combustion chamber 22. Specifically, piston 18 may be slidably disposed within each cylinder 16 to reciprocate between a top-dead-center (TDC) position and a bottom-dead-center (BDC) position, and cylinder head 20 may be positioned to cap off an end of cylinder 16, thereby forming combustion chamber 22. Engine 10 may include any number of combustion chambers 22 and combustion chambers 22 may be disposed in an "in-line" configuration, in a "V" configuration, in an opposing-piston configuration, or in any other suitable configuration.

Engine 10 may also include a crankshaft 24 rotatably disposed within engine block 14. A connecting rod 26 may connect each piston 18 to crankshaft 24 so that a sliding motion of piston 18 between the TDC and BDC positions within each respective cylinder 16 results in a rotation of crankshaft 24. Similarly, a rotation of crankshaft 24 may result in a sliding motion of piston 18 between the TDC and BDC positions. In a four-stroke engine, piston 18 may reciprocate between the TDC and BDC positions through an intake stroke, a compression stroke, a power stroke, and an exhaust stroke. In a two-stroke engine, piston 18 may reciprocate between the TDC and BDC positions through a power/exhaust/intake stroke and an intake/compression stroke.

Cylinder head 20 may define one or more fluid passages 28 associated with each combustion chamber 22 that are configured to direct gas (e.g., air and/or exhaust) or a mixture of gas and fluid (e.g., fuel) into or out of the associated chamber 22. In the disclosed embodiment, cylinder head 20 is shown as defining a single passage 28. Passage 28 may represent either an intake passage or an exhaust passage in this embodiment. It should be noted that, while only a single fluid passage 28 is shown, as many intake and/or exhaust passages may be provided within cylinder head 20 as desired. As an intake passage, passage 28 would be configured to deliver compressed air and/or an air and fuel mixture into a top end of combustion chamber 22. As an exhaust passage, passage 28 would be configured to direct exhaust and residual gases from the top end of combustion chamber 22 to the atmosphere. It is contemplated that, in some embodiments, only an exhaust passage may be formed within cylinder head 20 and the corresponding intake passage may instead be formed within engine block 14. In these configurations, the intake passage would be configured to direct air or the mixture of air and fuel radially inward to combustion chamber 22 through a side wall of cylinder 16.

A plurality of gas exchange valves 30 may be disposed within openings of passage 28 and movable to selectively engage corresponding seats 32. Specifically, each valve 30 may be movable between a first position at which valve 30 is engaged with seat 32 to inhibit a flow of fluid through the opening, and a second position at which valve 30 is moved away from seat 32 (i.e., lifted) to allow a flow of fluid through the opening. The timing at which valve 30 is moved away from seat 32 (relative to a position of piston 18 between the TDC and BDC positions), as well as a lift height of valve 30 at the particular timing, may have an effect on the operation of engine 10. For example, the timing and lift height may affect production of emissions, production of power, fuel consumption, efficiency, temperature, pressure, etc. A spring 36 may be associated with each valve 30 and configured to bias valve 30 toward the first position and against seat 32. A spring retainer, not shown, may connect spring 36 to a stem end of each valve 30.

Valve actuation system 12 may be operatively engaged with cylinder head 20 and configured to simultaneously move valves 30 against the biases of springs 36 from their first positions toward their second positions at desired timings. It should be noted that, when each cylinder head 20 is provided within both intake and exhaust passages and corresponding intake and exhaust valves, engine 10 may include a separate valve actuation assembly for each set of intake and exhaust valves. Each valve actuation system 12 may include, among other things, a common camshaft 38, a dedicated cam follower arrangement (e.g., cam followers, push rods, etc.) 40, and a dedicated rocker arm 42.

Camshaft 38 may operatively engage crankshaft 24 in any manner readily apparent to one skilled in the art, where a rotation of crankshaft 24 results in a corresponding rotation of camshaft 38. For example, camshaft 38 may connect to crankshaft 24 through a gear train (not shown) that decreases the rotational speed of camshaft 38 to approximately one half of the rotational speed of crankshaft 24 (in the exemplary 4-stroke arrangement). Alternatively, camshaft 38 may connect to crankshaft 24 through a chain, a belt, or in any other appropriate manner. At least one cam lobe 44 may be connected to camshaft 38 and associated with each pairing of valves 30. An outer profile of cam lobe 44 may determine, at least in part, the actuation timing and lift profile of valves 30 during operation of engine 10.

Cam follower arrangement 40 may ride on and move in accordance with the profile of cam lobe 44 as camshaft 38 rotates, and transfer a corresponding reciprocating motion to a first pivoting end of rocker arm 42. This reciprocating motion imparted to rocker arm 42 may cause rocker arm 42 to pivot about a pivot point 46, thereby creating a corresponding reciprocating motion at an opposing second end of rocker arm 42 that lifts and releases valves 30. Thus, the rotation of camshaft 38 may cause valves 30 to move from the first position to the second position to create a specific lift pattern corresponding to the profile of cam lobe 44.

Rocker arm 42 may be connected to valves 30 by way of a valve bridge assembly 48. Specifically, rocker arm 42 may include a pin or button 45 that is received within a bore (not shown) at the second end of rocker arm 42. Button 45 may be able to swivel somewhat within the bore of rocker arm 42, and include a generally flat end surface that is configured to slide along a corresponding planar portion of valve bridge assembly 48. The ability of button 45 to swivel and slide along the planar portion of valve bridge assembly 48 may allow rocker arm 42 to transmit primarily vertical (i.e., axial)

forces into valve bridge assembly 48. The only horizontal (i.e., transverse) forces transmitted between rocker arm 42 and valve bridge assembly 48 may be relatively low and due only to friction at the sliding interface between button 45 and bridge assembly 48. This interface may be lubricated and/or polished to reduce the associated friction.

Figure 2:
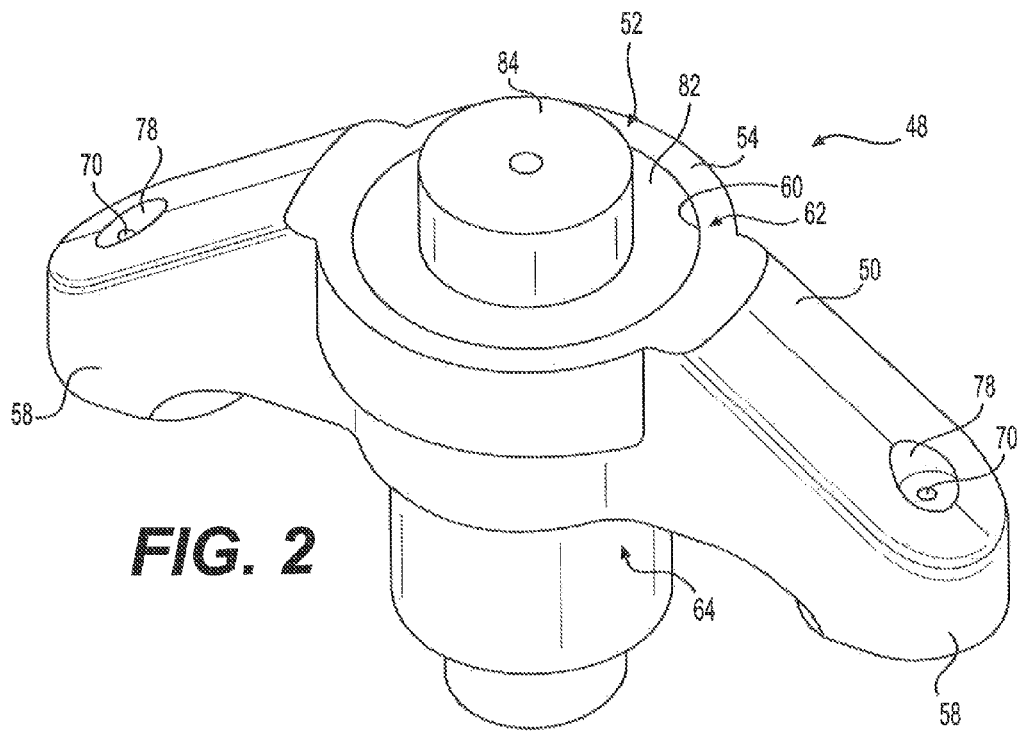
FIG. 2 is an isometric illustration of an exemplary disclosed valve bridge assembly that may be used in conjunction with the engine valve actuation system of FIG. 1.
Figure 3:
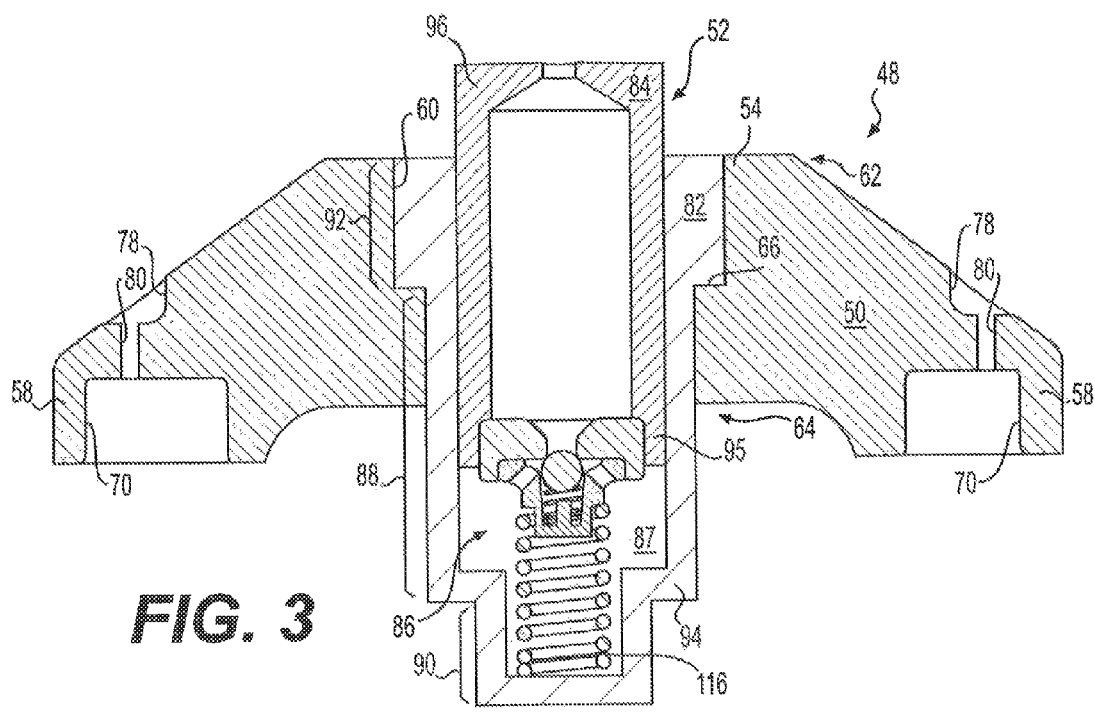
FIG. 3 is a cross-sectional illustration of the valve bridge assembly of FIG. 2.

An exemplary valve bridge assembly 48 is shown in FIGS. 2 and 3. As can be seen in these figures, valve bridge assembly 48 may include, among other things, a valve bridge 50, and a valve cartridge 52 removably disposed with a central portion 54 of valve bridge 50. As will be described in more detail below, valve cartridge 52 may function as a lash adjuster that is configured to adjust a clearance between valves 30 and seats 32 (and/or between other valve train components) when cam lobe 44 is rotated away from cam follower arrangement 40.

Valve bridge ("bridge") 50 may have a generally C-shaped body, with lateral extensions 58 protruding radially outward from opposing sides of central portion 54. An upper end 62 of bridge 50 (i.e., the surface oriented toward rocker arm 42) may slope downward toward lateral extensions 58, such that the upper end is generally convex. In contrast, a lower end 64 of bridge 50 may be generally concave (e.g., distal ends of lateral extensions 58 may protrude lower than central portion 54) and have a flat bottom between downward protrusions of lateral extensions 58.

A stepped bore 60 may form a central cavity within central portion 54 of bridge 50, and include a larger opening at upper end 62 and a smaller opening at lower end 64. In one embodiment, the smaller opening may have a diameter that is about 75-80% (e.g., within engineering tolerances) of the diameter of the larger opening. An internal annular shelf 66 (shown only in FIG. 3) may be formed axially between (e.g., about half-way between) upper end 62 and lower end 64.

Additional bores 70 may be formed within valve bridge 50 at lateral extensions 58, and function as stem pockets to receive stem ends of valves 30. A generally cylindrical collection reservoir 78 may be located at each lateral extension 58 in opposition to bore 70 and configured to fill with splashed oil during operation of engine 10. An axially-oriented passage 80 may connect collection reservoir 78 to the associated and oppositely oriented bore 70, thereby providing lubrication to bore 70. Passage 80 may have an internal diameter less than an internal diameter of collection reservoir 78 (e.g., the diameter of passage 80 may be about one-third to one-fourth of the diameter of collection reservoir 78). This diametrical relationship may help a supply of fluid to build within collection reservoir 78, while still providing sufficient lubrication to bore 70.

Valve cartridge 52 may be a sub-assembly of components that can be removably replaced as a single integral unit within valve bridge assembly 48. These components may include, among other things, an adjuster sleeve or housing 82, a plunger 84, and a check valve assembly 86 (shown only in FIGS. 3 and 4). Housing 82 may be a hollow and generally cylindrical body that is loosely-fitted into stepped bore 60. Plunger 84 may be slidingly disposed within housing 82, and check valve assembly 86 may be disposed between internal ends of housing 82 and plunger 84.

Housing 82 may be a generally hollow and cylindrical component having an open main portion 88, a closed tip portion 90, and a positioning flange 92 extending radially outward at a mouth of main portion 88. In the disclosed embodiment, tip portion 90 has a smaller outer diameter than main portion 88, and a step 94 is located at a transition between these portions. As will be described in more detail below, the smaller diameter of tip portion 90 may provide more clearance for springs 36 and the associated spring retainers (referring to FIG. 1) of valve actuation assembly 48. Positioning flange 92 may be configured to rest against internal annular shelf 66, thereby positioning housing 82 relative to bridge 50. An axial length of positioning flange 92 may be about the same as an axial length of tip portion 90, and the axial length of tip portion 90 may be about ⅓-¼ of an axial length of main portion 88. These length relationships may allow for some distortion of bridge 50, while still providing proper alignment of housing 82.

Tip portion 90 may pass completely through bridge 50 and protrude from lower end 64, while the mouth of positioning flange 92 is co-located (e.g., flush) with an upper-most surface of bridge 50 at upper end 62. The exterior of housing 82, may be stepped so as to generally match the stepped profile of bore 60, and the interior of housing 82 may mimic the exterior. Plunger 84 may be slidingly received within main portion 88 of housing 82, while check valve assembly 86 may be press-fitted into the internal end of plunger 84.

Plunger 84 may also be a generally hollow and cylindrical component having a larger open end 95 and smaller open end 96 located opposite end 95. End 95 of plunger 84 may be received first within main portion 88 of housing 82, such that plunger 84 is generally inverted with respect to housing 82. End 96 may protrude a distance out of housing 82 and valve bridge 50, and an external surface thereof may function as the planar engagement surface of valve bridge assembly 48 with button 45 of rocker arm 42. The smaller opening at end 96 may function as a hydraulic conduit from the engagement surface to an interior of plunger 84. The larger diameter of plunger 84 at end 95 may receive check valve assembly 86. An annular clearance may exist between plunger 84 and the internal walls of housing 82. This clearance may provide a slip fit of plunger 84 inside housing 82. In some instances, the clearance may be large enough to accommodate warping of bridge 50 and some deformation of housing 82 without significantly affecting movement of plunger 84 (i.e., without causing pinching of plunger 84). An axial length of plunger 84 may be about the same as an axial length of main portion 88 of housing 82.

Figure 4:
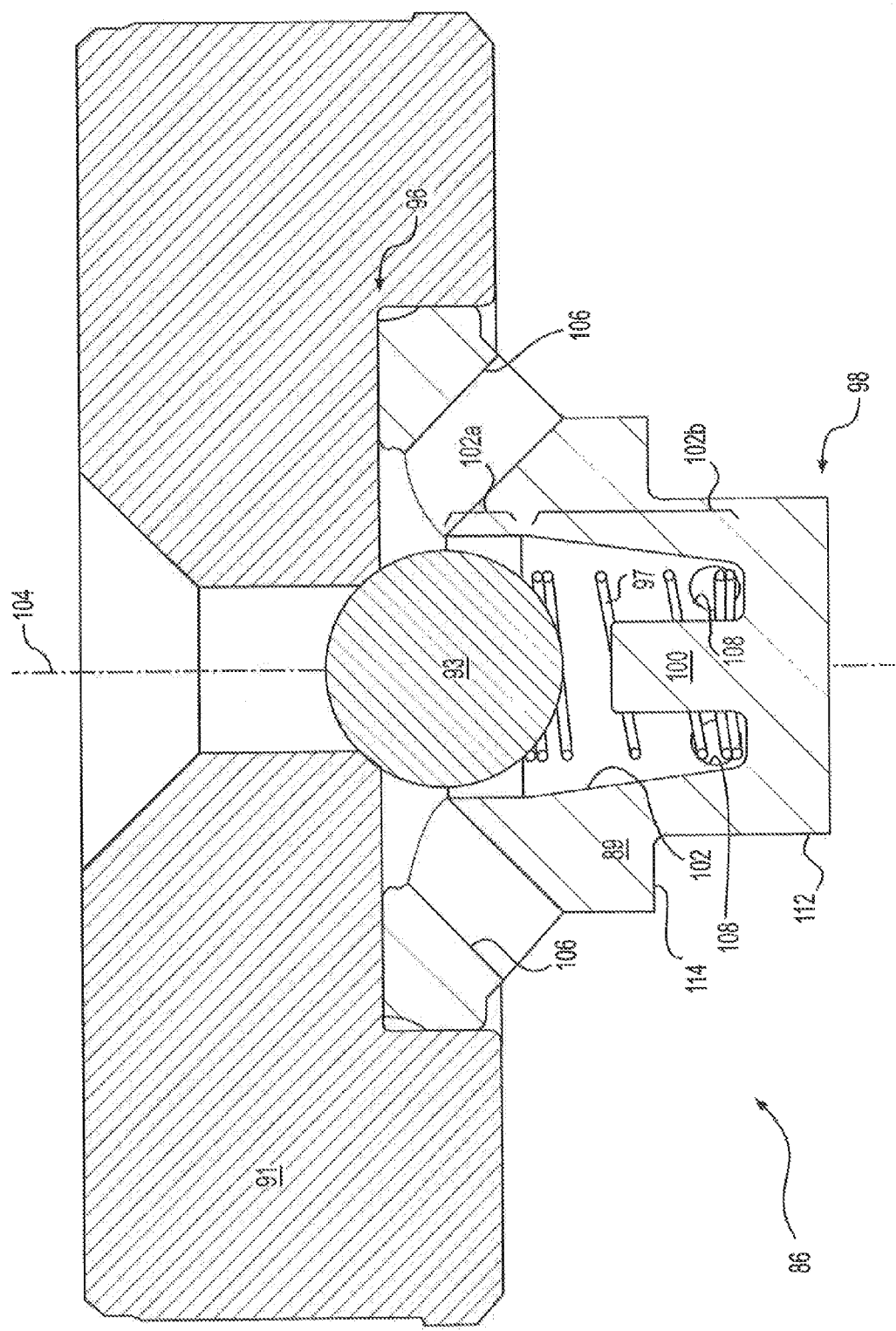
FIG. 4 is a cross-sectional illustration of an exemplary disclosed check valve that may form a portion of the valve bridge assembly of FIG. 2.

Check valve assembly 86 may function to selectively allow fluid from within plunger 84 to enter a lower hydraulic chamber 87 of housing 82 below a rim of plunger 84. This fluid may then become trapped in chamber 87 of housing 82 and facilitate load transfer from rocker arm 42 to valves 30 (referring to FIG. 1). As shown in FIG. 4, check valve assembly 86 may include, among other things, a housing 89, a valve seat 91 disposed at one end (e.g., at an upper end in the configuration of FIG. 3) of housing 89, a valve element 93 disposed within housing 89, and a spring 97 configured to bias valve element 93 against valve seat 91.

Housing 89 may be hollow and generally cylindrical, having an open end 96 oriented toward valve seat 91 and an opposing closed end 98. A post 100 may be integrally formed inside housing 89 and extend from closed end 98 a distance toward open end 96. Valve element 93 may be received by housing 89 via open end 96, and limited by post 100 from contacting closed end 98.

Housing 89 may at least partially define an internal annular wall 102 that extends from closed end 98 to open end 96. Wall 102 may be divided into an element guide section 102a located adjacent open end 96, and a spring guide section 102b connecting section 102a to closed end 98, in the disclosed embodiment, section 102a may be straight (i.e., wall 102 in section 102b may be generally parallel with a central axis 104 of housing 89), while section 102b may taper inward toward closed end 98. Section 102a, being straight, may function as a guide for element 93 without causing binding of element 93. The taper angle of section 102b may be selected to guide a static base portion of spring 97 without causing a rubbing interference with an active middle portion of spring 97. The internal diameter of section 102b at closed end 98 may be selected to center spring 97 with post 100, while inhibiting any portion of spring 97 from contacting post 100. In the disclosed embodiment, an outer diameter of post 100 may be about equal to or less than one-half of an inner diameter of section 102b. When element 93 is inside housing 89, the distance that post 100 extends toward open end 96 may inhibit element 93 from contacting the tapered walls of section 102b.

A plurality of ports 106 may pass through wall 102 of housing 89 at a location between open and closed ends 96, 98 (e.g., at a location between open end 96 and section 102a). Ports 106 may be oriented at an oblique angle relative to axis 104, and function to communicate an interior of plunger 84 with chamber 87 when valve element 93 is away from seat 91. In the disclosed embodiment, valve element 93 is a ball element. When element 93 is exposed to a fluid pressure inside plunger 84 that generates a force on element 93 great enough to overcome the upward bias of spring 97, element 93 may be pushed axially downward against post 100. When this happens, an annular space may be formed between seat 91 and element 93, thereby allowing the pressurized fluid inside plunger 84 to enter housing 89. This fluid may then pass through ports 106 to chamber 87 below. In one embodiment, four ports 106 are formed within wall 102 of housing 89 and spaced generally equidistant around its perimeter. A combined flow area of ports 106 may be about equal to a flow area of the annular space formed when element 93 is pushed completely against post 100. This relationship may be created when an axial distance from a distal end of post 100 to an intersection of sections 102a and 102b is about the same as or less than a radius of section 102a.

A plurality of radial ports 108 may pass through wall 102 of housing 89 at section 102b. Ports 108 may be oriented generally orthogonal to axis 104, and function as leak paths for any fluid that may become trapped inside housing 89 between element 93 and closed end 98. In the disclosed embodiment, four radial ports 108 are included in housing 89 and spaced generally equidistant around its perimeter.

Housing 89 may further include an outer annular surface 110. Surface 110 may be stepped to form an outer spring guide 112, and a spring stop 114 located at a base end of guide 112. In particular, referring to FIG. 3, a spring 116 may be located inside housing 82. Spring 116 may have a lower end received within tip portion 90 of housing 82, and an upper end disposed around guide 112 and pushed up against stop 114. In this configuration, spring 116 may exert an upward force on plunger 84 via valve assembly 86.

INDUSTRIAL APPLICABILITY

The disclosed valve bridge assembly may have applicability with internal combustion engines. The valve bridge assembly may be used to lift multiple gas exchange valves (e.g., intake valves and/or exhaust valves) at the same time and by the same amount. The valve bridge assembly may have easily replaceable components, which allow reduced time and effort in field repair. In addition, the disclosed valve bridge assembly may lend itself to remanufacture and reuse, resulting in lower operating costs for the engine owner.

The disclosed valve bridge assembly may also have increased reliability. In particular, because of the guiding geometry and dimensional relationships of housing 89, seat 91 and element 93, there may be little chance (if any) for element 93 to be moved off center or to become stuck within housing 89.

It will be apparent to those skilled in the art that various modifications and variations can be made to the bridge assembly of the present disclosure without departing from the scope of the disclosure. Other embodiments will be apparent to those skilled in the art from consideration of the specification and practice of the embodiments disclosed herein. It is intended that the specification and examples be considered as exemplary only, with a true scope of the disclosure being indicated by the following claims.

What is claimed is:
1. A valve body, comprising:
a housing having an open end and a closed end, a post located inside the housing and extending from the closed end toward the open end, and at least one port passing through an annular wall of the housing at a location between the open and closed ends, wherein the housing at least partially defines an internal annular wall having a straight section located adjacent the open end and a tapered section connecting the straight section to the closed end;
a valve seat disposed at the open end of the housing;
a valve element disposed within the housing and movable between a distal end of the post and the valve seat, the valve element being a ball, wherein an axial distance that the ball can move between the post and the valve seat is configured to create an annular flow area about equal to flow area of the at least one port, wherein when the ball is against the post, the ball is inhibited from contacting the tapered section of the internal annular wall and an angle of the tapered section of the internal annular wall inhibits the active portion of the spring from contacting the internal annular wall, wherein a diameter of the tapered section at the closed end of the housing functions to guide the spring and inhibit the spring from contacting the post, wherein the at least one port is formed within the straight section and oriented at an oblique angle relative to an axis of the internal annular wall, and the housing further has at least one radial port formed within the tapered section and oriented generally orthogonal to the axis of the internal annular wall, wherein the at least one port includes a plurality of ports and the at least one radial port includes a plurality of radial ports; and
a spring disposed over the post and configured to bias the valve element against the valve seat, wherein the spring includes an active portion and a static portion, and wherein the housing includes an outer spring guide at the closed end, and a spring stop located at a base of the outer spring guide, and the at least one radial port passes through the outer spring.

* * * * *